(12) United States Patent
Chaturvedi et al.

(10) Patent No.: US 8,396,989 B2
(45) Date of Patent: Mar. 12, 2013

(54) RESOURCE PLANNING AND DATA INTERCHANGE FUNCTIONALITY WITHIN A CLOUD COMPUTING ENVIRONMENT

(75) Inventors: Vinatha Chaturvedi, Bangalore (IN); Kavita Chavda, Roswell, GA (US); Christopher J. Dawson, Arlington, VA (US); Wesley M. Devine, Apex, NC (US); Thirumal Nellutla, Schaumburg, IL (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/636,669

(22) Filed: Dec. 11, 2009

(65) Prior Publication Data
US 2011/0145439 A1    Jun. 16, 2011

(51) Int. Cl.
G06F 15/173    (2006.01)
(52) U.S. Cl. .................................... 709/244; 709/238
(58) Field of Classification Search .................. 709/238, 709/244
See application file for complete search history.

(56) References Cited

U.S. PATENT DOCUMENTS

| | | | |
|---|---|---|---|
| 7,024,475 B1 * | 4/2006 | Abaye et al. ................. | 709/224 |
| 7,428,728 B2 | 9/2008 | Tewksbary | |
| 8,108,554 B1 * | 1/2012 | Masters ......................... | 709/245 |
| 8,112,471 B2 * | 2/2012 | Wei et al. ...................... | 709/202 |
| 2005/0044148 A1 | 2/2005 | Son et al. | |
| 2006/0026281 A1 | 2/2006 | Hodgson et al. | |
| 2006/0168117 A1 | 7/2006 | Paparella et al. | |
| 2006/0212332 A1 | 9/2006 | Jackson | |
| 2010/0235355 A1 * | 9/2010 | Carter et al. ................. | 707/736 |
| 2010/0332818 A1 * | 12/2010 | Prahlad et al. ................ | 713/150 |
| 2011/0016214 A1 * | 1/2011 | Jackson ........................ | 709/226 |
| 2011/0137973 A1 * | 6/2011 | Wei et al. ...................... | 709/202 |
| 2011/0138050 A1 * | 6/2011 | Dawson et al. ............... | 709/226 |
| 2011/0231899 A1 * | 9/2011 | Pulier et al. ......................... | 726/1 |

OTHER PUBLICATIONS

Mell et al., "The NIST Definition of Cloud Computing", National Institute of Standards and Technology, Information Technology Laboratory, Version 15, Oct. 7, 2009, 2 pages.
Goyal, P., "The Virtual Business Services Fabric: an integrated abstraction of Services and Computing Infrastructure", 2009 18th IEEE International Workshops on Enabling Technologies: Infrastructures for Collaborative Enterprises, pp. 33-38.
Thain, D. et al., "Abstractions for Cloud Computing with Condor", Aug. 2009, 22 pages. http://www.cse.nd.edu/~ccl/research/pubs/abstractions-cloud-chapter.pdf.
Lublinsky, B., "Clearing the Air on Cloud Computing", Apr. 2009, 2 pages. http://www.infoq.com/news/2009/04/air.

(Continued)

*Primary Examiner* — Brian P Whipple
(74) *Attorney, Agent, or Firm* — William E. Schiesser; Ronald A. D'Alessandro; Keohane & D'Alessandro PLLC

(57) ABSTRACT

The present invention provides technology neutral process integration (Cloud Resource Planning), and optimization methodology leveraging a business meta-schema format Cloud Data Interchange (CDI) to integrate, enable, and invoke Cloud services. One example is that the present invention provides a management layer at the process level. There can be multiple Cloud implementations/types within a govern enterprise—perhaps utilizing different infrastructure (e.g., hardware of one supplier versus that of another) or different areas of functionality (computing services, storage services, etc). This disclosure provides an abstraction or 'resource planning' layer above these core services such that a customer does not have to have knowledge or choose different Cloud types and/or understand or choose each underlying service. As such, it provides a 'one stop' portal.

23 Claims, 10 Drawing Sheets

OTHER PUBLICATIONS

Rochwerger, B. et al., "The RESERVOIR Model and Architecture for Open Federated Cloud Computing", IBM Journal of Research and Development, vol. 53, No. 4 (2009), 17 pages.

Kumar, S., "New abstractions and mechanisms for virtualizing future many-core systems" (Abstract), Ph.d. 2008, Georgia Institute of Technology, Adviser: Karsten Schwan, vol. 69/09-B of Dissertations Abstracts International, p. 5536, Order No. AADAA-I3327603, 131 pages.

Dornemann, E. et al., "On-Demand Resource Provisioning for BPEL Workflows Using Amazon's Elastic Compute Cloud", 9th IEEE/ACM International Symposium on Cluster Computing and the Grid, Shanghai, China (2009), pp. 140-147.

Vecchiola, C. et al., "Aneka: A Software Platform for .NET-based Cloud Computing", In High Performance and Large Scale Computing, W. Gentzsch, L. Grandinetti, G. Joubert (Eds.), IOS Press, Amsterdam, Netherlands (2009), 30 pages.

Campbell, R. et al., Open Cirrus™ Cloud Computing Testbed: Federated Data Centers for Open Source Systems and Services Research, 9th IEEE/ACM International Symposium on Cluster Computing and the Grid, Shanghai, China (2009)., 5 pages.

Morin, C. et al., "Clouds: a New Playground for the XtreemOS Grid Operating System", INRIA Research Report, Feb. 2009, 16 pages.

Bernstein, D. et al., "Blueprint for the Intercloud—Protocols and Formats for Cloud Computing Interoperability", Fourth International Conference on Internet and Web Applications and Services (2009), pp. 328-336.

Siebeck, R. et al., "Cloud-based Enterprise Mashup Integration Services for B2B Scenarios", MEM2009 workshop in conjunction with WWW2009, Apr. 20-24, 2009, Madrid, Spain, 9 pages.

Tordsson, J., "Portable Tools for Interoperable Grids", Ph.D. Thesis, Mar. 2009; Department of Computing Science, Umea University, 72 pages.

Merzky, A. et al., "Application Level Interoperability between Clouds and Grids", Workshops at the Grid and Pervasive Computing Conference, GPT 2009, May 4-8, 2009, Geneva, Switzerland, pp. 143-159.

Mietzner, R. et al., "Business Grid: Combining Web Services and the Grid", K. Jensen and W. van der Aaist (Eds.): ToPNoC II, LNCS 5460, pp. 136-151, 2009. Copyright Springer-Verlag Berlin Heidelberg 2009.

* cited by examiner

| Select | Enterprise | Organization | User | Role | Category | Service | Status | Resource | Handler | Api |
|---|---|---|---|---|---|---|---|---|---|---|
| ☐ | XYZ | STG | TestUsr1 | Sysadmin1 | Operations | Storage Ensemble Manager | Not Started | Storage Ensemble | storage_ensemble_script.txt | allocate |
| ☐ | XYZ | STG | TestUsr1 | Sysadmin1 | Operations | Storage Ensemble Manager | Not Started | Storage Ensemble | storage_ensemble_script.txt | ls |
| ☐ | XYZ | STG | TestUsr1 | Sysadmin1 | Operations | DTspark,AllocateVM | Not Started | DTspark | DT_spark_batch_script.txt | /ptc/drivers/live/qinstall |
| ☐ | XYZ | STG | TestUsr2 | Sysadmin2 | Operations | DTspark,RemoveVM | Not Started | DTspark | DT_spark_batch_script.txt | dtvmremove |
| ☐ | XYZ | STG | TestUsr3 | Sysadmin3 | Operations | DTspark,StopVM | Not Started | DTspark | DT_spark_batch_script.txt | dtvmstop |
| ☐ | XYZ | STG | TestUsr3 | Sysadmin3 | Operations | QRS | Successful | TPM | TPM | /home/TPM_AP/tpm_op |
| ☐ | XYZ | STG | TestUsr3 | Sysadmin3 | Operations | QRS | Successful | TPM | TPM | /home/TPM_AP/tpm_op |
| ☐ | XYZ | STG | TestUsr1 | Sysadmin1 | Public Cloud | ABC | Successful | ABC | ABC | C:\sasi\zPOC\ABC\ec tools\ec2-api-tools-1.3-26 \bin\ec2-describe-images |
| ☐ | XYZ | STG | TestUsr1 | Sysadmin1 | Public Cloud | ABC | Not Started | ABC | ABC | dir |
| ☐ | XYZ | STG | TestUsr1 | Sysadmin1 | Business Applications | DEF | Successful | DEF | DEF | c:\mylyn\DEFTask.ba |

FIG. 4

RESOURCE PLANNING AND DATA INTERCHANGE FUNCTIONALITY WITHIN A CLOUD COMPUTING ENVIRONMENT

FIELD OF THE INVENTION

The present invention generally relates to Cloud computing. Specifically, the present invention relates to resource data planning and data interchange functionality within a Cloud computing environment.

BACKGROUND OF THE INVENTION

Cloud computing has become a popular way to offer various Information Technology (IT) concepts as services. In general, Cloud computing is a computing technology that uses the Internet and central remote servers to maintain data and applications. In one implementation, a consumer or requester can request a service they desire and transact with a Cloud provider for the needed service. A Cloud provider may employ multiple Clouds when providing a set (i.e., at least one) of services to a customer. Cloud services can represent anything such as: IT services, home grown applications, business applications like SAP®, Oracle®, Customer Relationship Management (CRM), and public Cloud services like Amazon®. In an environment having multiple Cloud implementations/types, both administrators and users have to access each Cloud system to request services separately. This causes users to separately log on to each system. Given the widespread nature of Cloud computing in general, this can be overly burdensome.

SUMMARY OF THE INVENTION

The present invention provides technology neutral process integration (Cloud Resource Planning), methodology leveraging a business meta-schema format Cloud Data Interchange (CDI) to integrate, enable, and invoke Cloud services. In one example, this invention provides at a management layer at the business process level. There can be multiple Cloud implementations/types within a governing enterprise—perhaps utilizing different infrastructure (e.g., hardware of one supplier versus that of another) or different areas of functionality (computing services, storage services, etc). This disclosure provides an abstraction or 'resource planning' layer above these core services such that a customer does not have to have knowledge of or choose different cloud types and/or understand or choose each underlying service. As such, it provides a 'one stop' portal.

The invention allows customers to use the resource planning layer to learn about each of the different Cloud services being offered. The layer interprets the request and invokes each underlying Cloud service. While this disclosure describes multiple Cloud implementations within one enterprise, it should be understood that the teachings recited herein can be applicable to any Cloud computing environment (e.g., over a public network and set of public Cloud providers). Along these lines, the present invention does not only describe a portal. Rather, it describes how the actual data is collected from multiple Cloud suppliers, at a business level, to be placed in the portal.

A first aspect of the present invention provides a method for providing resource planning and data interchange functionality within a Cloud computing environment, comprising: receiving a request for Cloud services at a Cloud portal hub of the Cloud computing environment; determining a Cloud implementation from a set of Cloud implementations for handling the request based on content of the request; and routing the request to a Cloud having the Cloud implementation via the Cloud portal hub.

A second aspect of the present invention provides a Cloud portal hub for providing resource planning and data interchange functionality within a Cloud computing environment, comprising: a memory medium comprising instructions; a bus coupled to the memory medium; and a processor coupled to the bus that when executing the instructions causes the Cloud hub to: receive a request for Cloud services; determine a Cloud implementation from a set of Cloud implementations for handling the request based on content of the request; and route the request to a Cloud having the Cloud implementation.

A third aspect of the present invention provides a computer readable medium containing a program product for providing resource planning and data interchange functionality within a Cloud computing environment, the computer readable medium comprising program code for causing a Cloud portal hub to: receive a request for Cloud services; determine a Cloud implementation from a set of Cloud implementations for handling the request based on content of the request; and route the request to a Cloud having the Cloud implementation.

A fourth aspect of the present invention provides a method for deploying a system for providing resource planning and data interchange functionality within a Cloud computing environment, comprising: providing a computer infrastructure being operable to: receive a request for Cloud services at a Cloud portal hub of the Cloud computing environment; determine a Cloud implementation from a set of Cloud implementations for handling the request based on content of the request; and route the request to a Cloud having the Cloud implementation via the Cloud portal hub.

BRIEF DESCRIPTION OF THE DRAWINGS

These and other features of this invention will be more readily understood from the following detailed description of the various aspects of the invention taken in conjunction with the accompanying drawings in which:

FIG. 4 shows an illustrative portal for Cloud resource planning and data interchange functionality according to the present invention.

Figure 1:
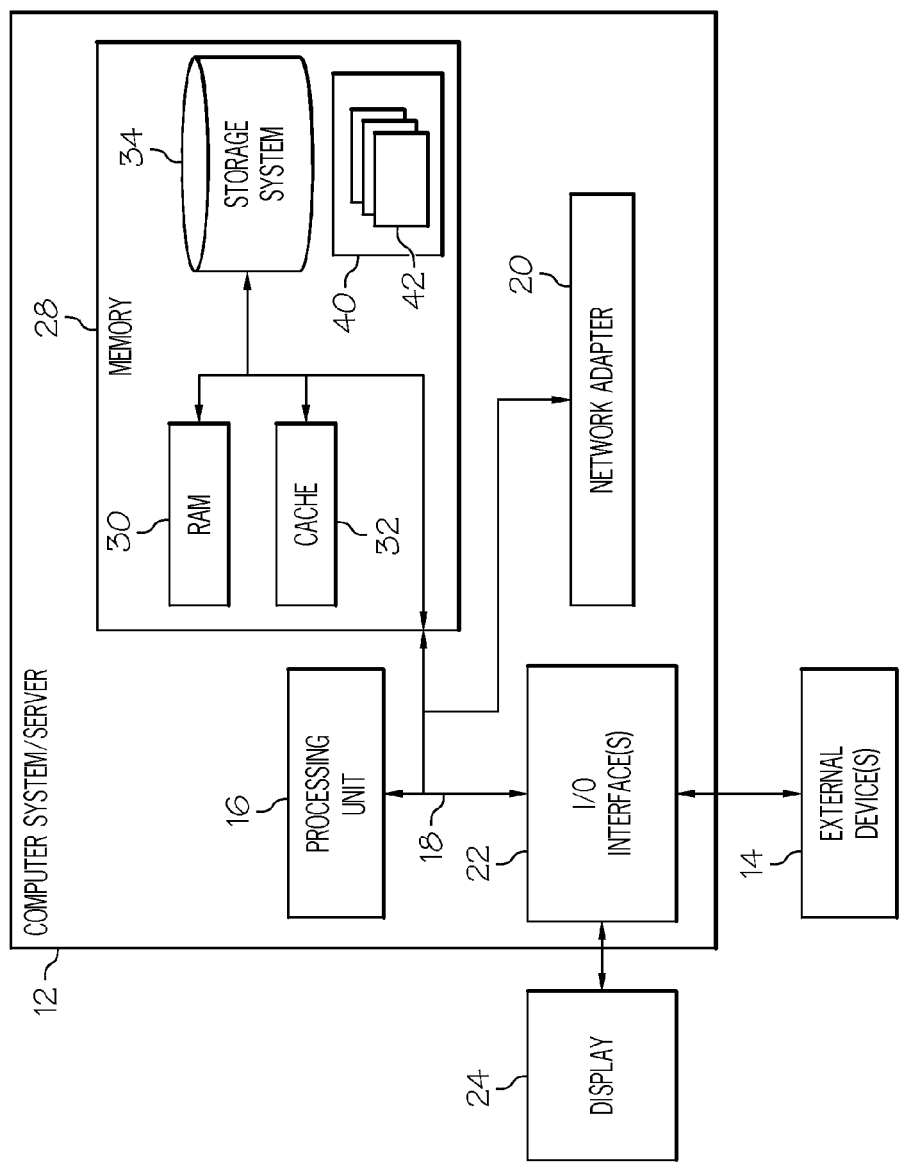
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. Cloud Computing Definitions
II. Detailed Implementation of the Invention I. Cloud Computing Definitions The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models (also known as "Cloud implementations" or "Cloud types") are as follows:

Private cloud: The Cloud infrastructure is operated solely for an organization. It may be managed by the organization or a third party and may exist on-premises or off-premises.

Community cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The Cloud infrastructure is made available to the general public or a large industry group and is owned by an organization selling Cloud services.

Hybrid cloud: The Cloud infrastructure is a composition of two or more clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Detailed Implementation of the Invention

The present invention provides technology neutral process integration (Cloud Resource Planning), methodology leveraging a business meta-schema format Cloud Data Interchange (CDI) to integrate, enable, and invoke Cloud services. In one example, this invention provides at a management layer at the business process level. There can be multiple Cloud implementations/types within a governing enterprise—perhaps utilizing different infrastructure (e.g., hardware of one supplier versus that of another) or different areas of functionality (computing services, storage services, etc). This disclosure provides an abstraction or 'resource planning' layer above these core services such that a customer does not have to have knowledge of or choose different cloud types and/or understand or choose each underlying service. As such, it provides a 'one stop' portal.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, and volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
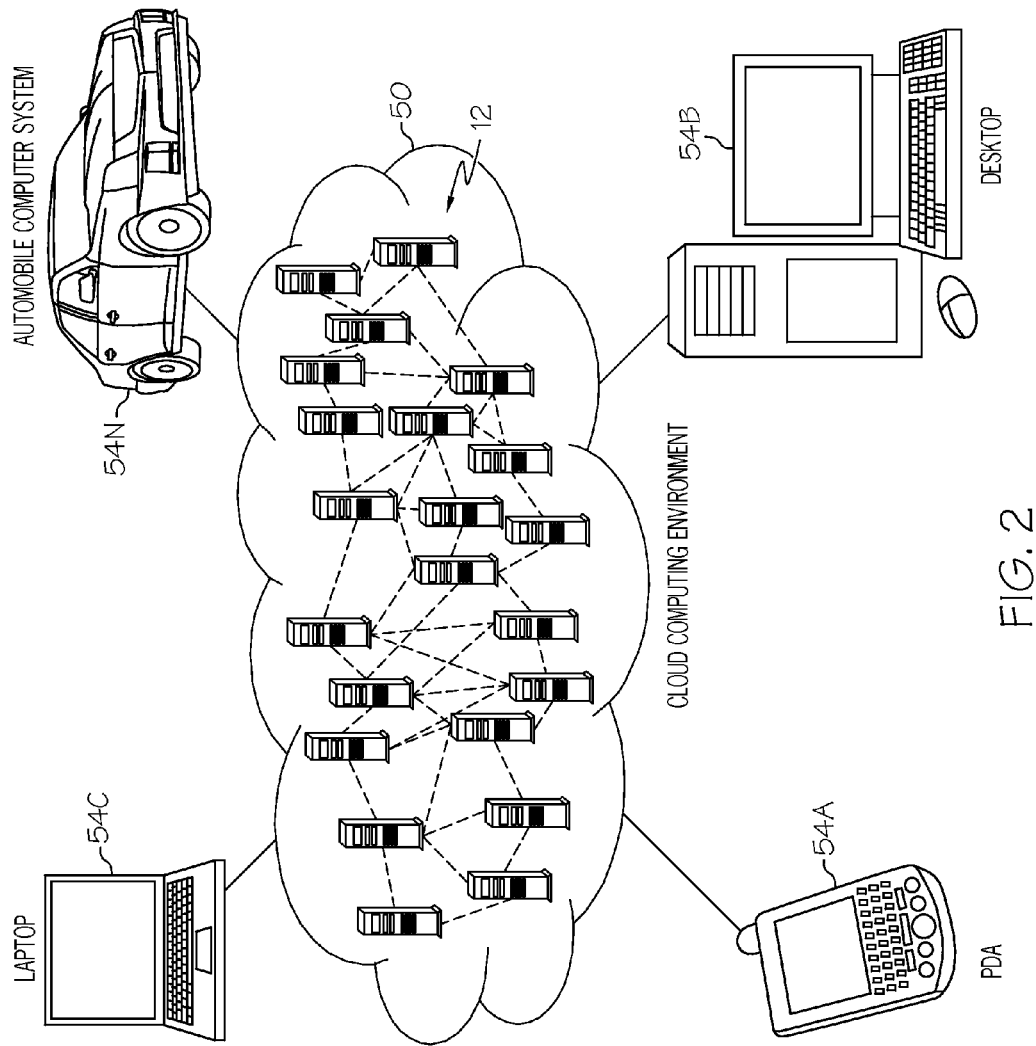
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50, so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
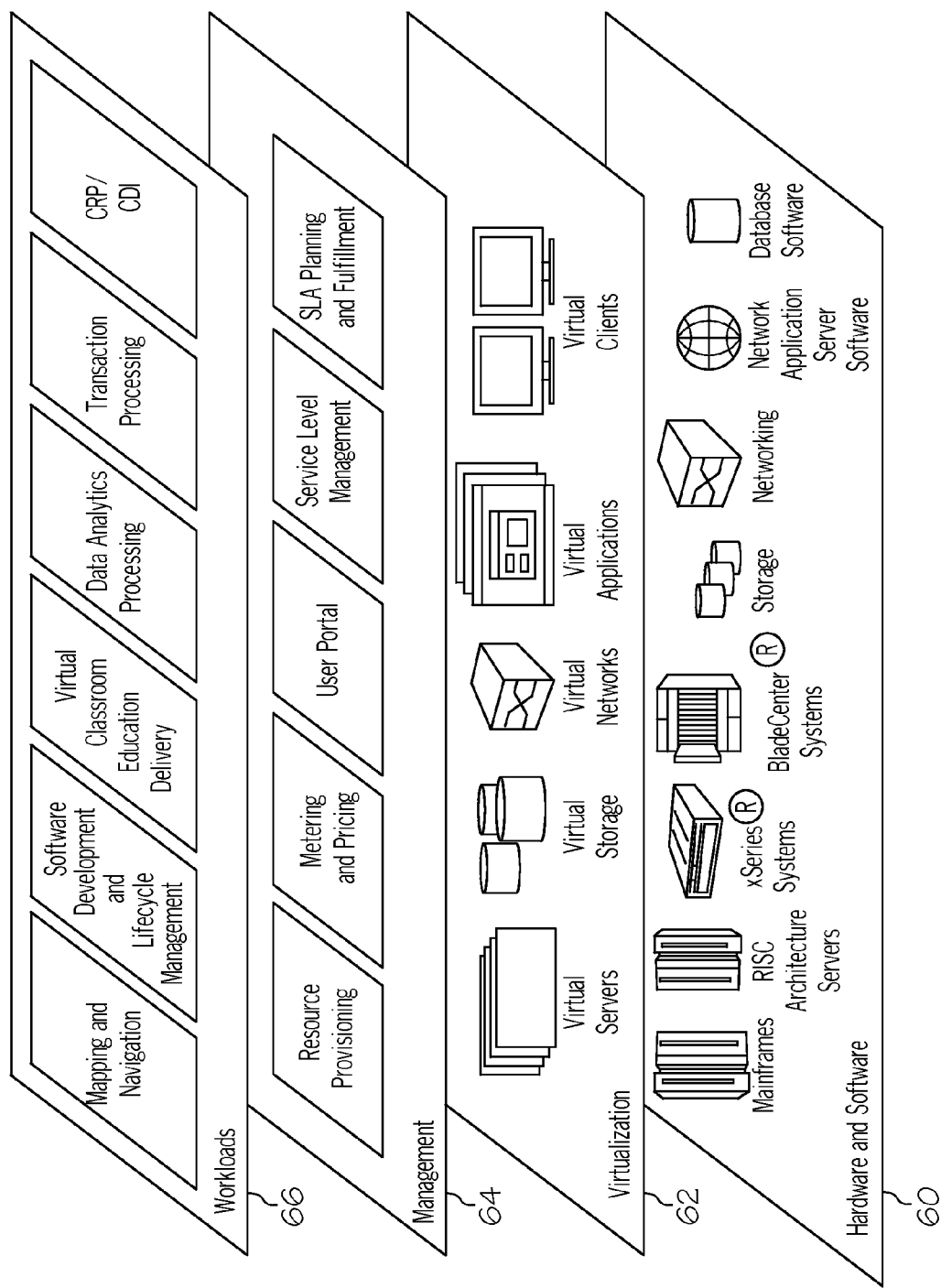
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and Cloud Resource Planning/Cloud Data Interchange (hereinafter referred to as CRP/CDI). As mentioned above, all of the foregoing examples described with respect to FIG. 3 are illustrative only, and the invention is not limited to these examples.

In general, CRP/CDI is defined as a message driven Hub and Spoke model to achieve integration of Cloud ecosystem at Business processes layer. CRP/CDI is a technology neutral implementation at a higher layer orchestration and does not need any changes to the existing systems in place. Along these lines, CRP is technology that is neutral to business process integration, optimization methodology leveraging a business meta-schema format CDI to seamlessly integrate, enable, and invoke Cloud services In a typical embodiment, a customer and/or administrator (generically referred to as a user) will utilize an interface for a Cloud portal hub to submit a request for Cloud services. The Cloud portal hub will: analyze/process the request; determine what Cloud implementation (e.g., type of Cloud) should handle the request; determine what actual Cloud service provider should fulfill the request; and then route the request accordingly (e.g., to the Cloud service provider via a Cloud having the determined Cloud type. The determination of a specific Cloud type, as well as the Cloud service provider, can be made by accessing a database comprising metadata that associates Cloud implementations and Cloud service providers with Cloud services. Because the Cloud portal hub is centralized, it can be accessed by any user from any location. Thus, the Cloud portal hub provides a centralized front end for handling Cloud service requests.

An example of an interface/view 70 Cloud portal hub is shown in FIG. 4. In general, view 70 represents a dashboard view of all requests being handled by the Cloud portal hub. As depicted, view 70 expresses information using a spreadsheet format. It should be understood that the use of a spreadsheet format is intended to be illustrative only and that many alternatives could be implemented hereunder. Regardless, as can be seen, various pieces of information can be included in making/processing requests. Examples include: user identification 72, user role 74, category of request/Cloud 76, requested Cloud service 78, request status 80, and resource applicable to fulfill the request 82, etc.

Figure 5:
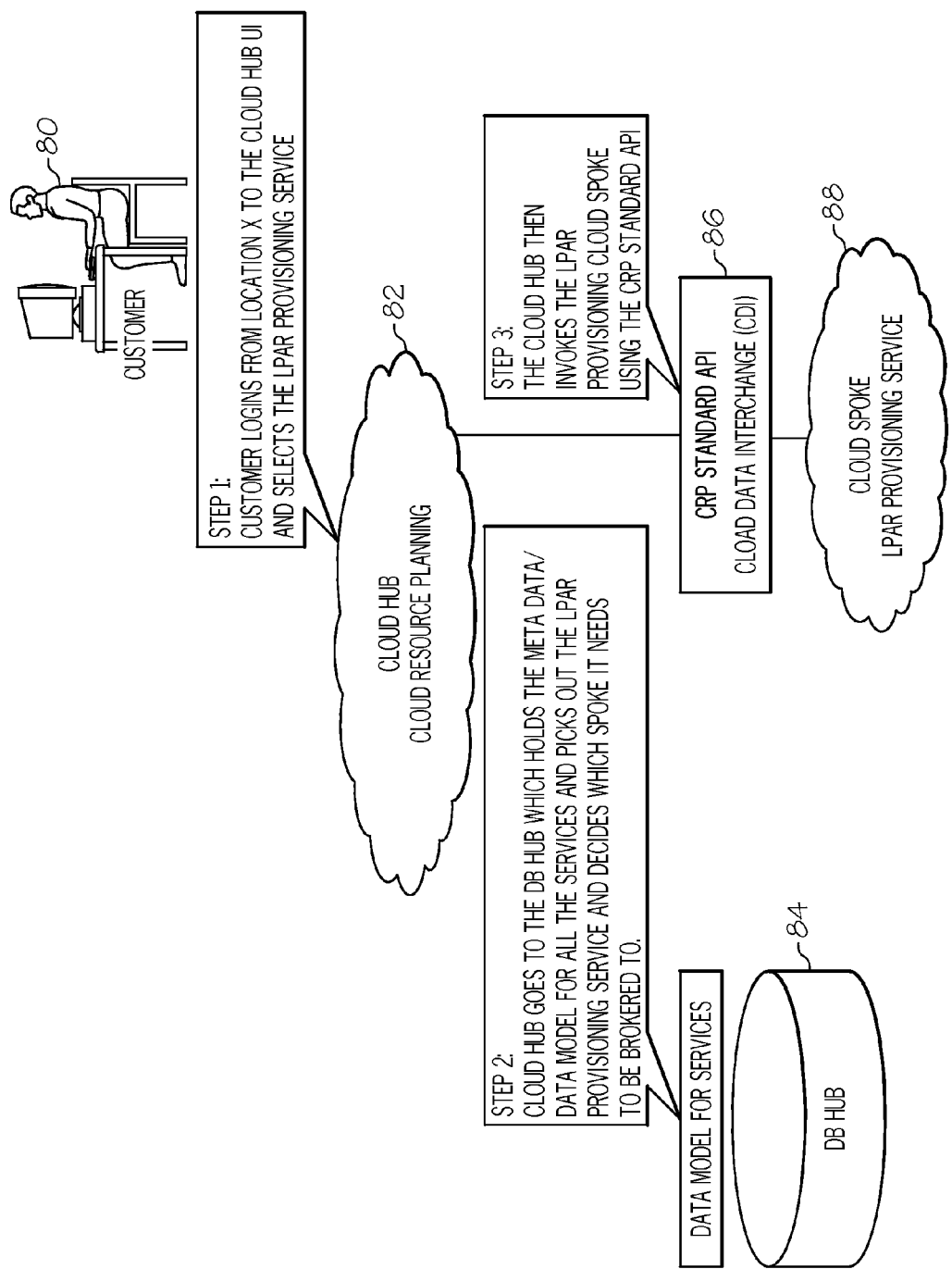
FIGS. 5-7 show illustrative scenarios utilizing the portal of FIG. 4 according to the present invention.
Figure 6:
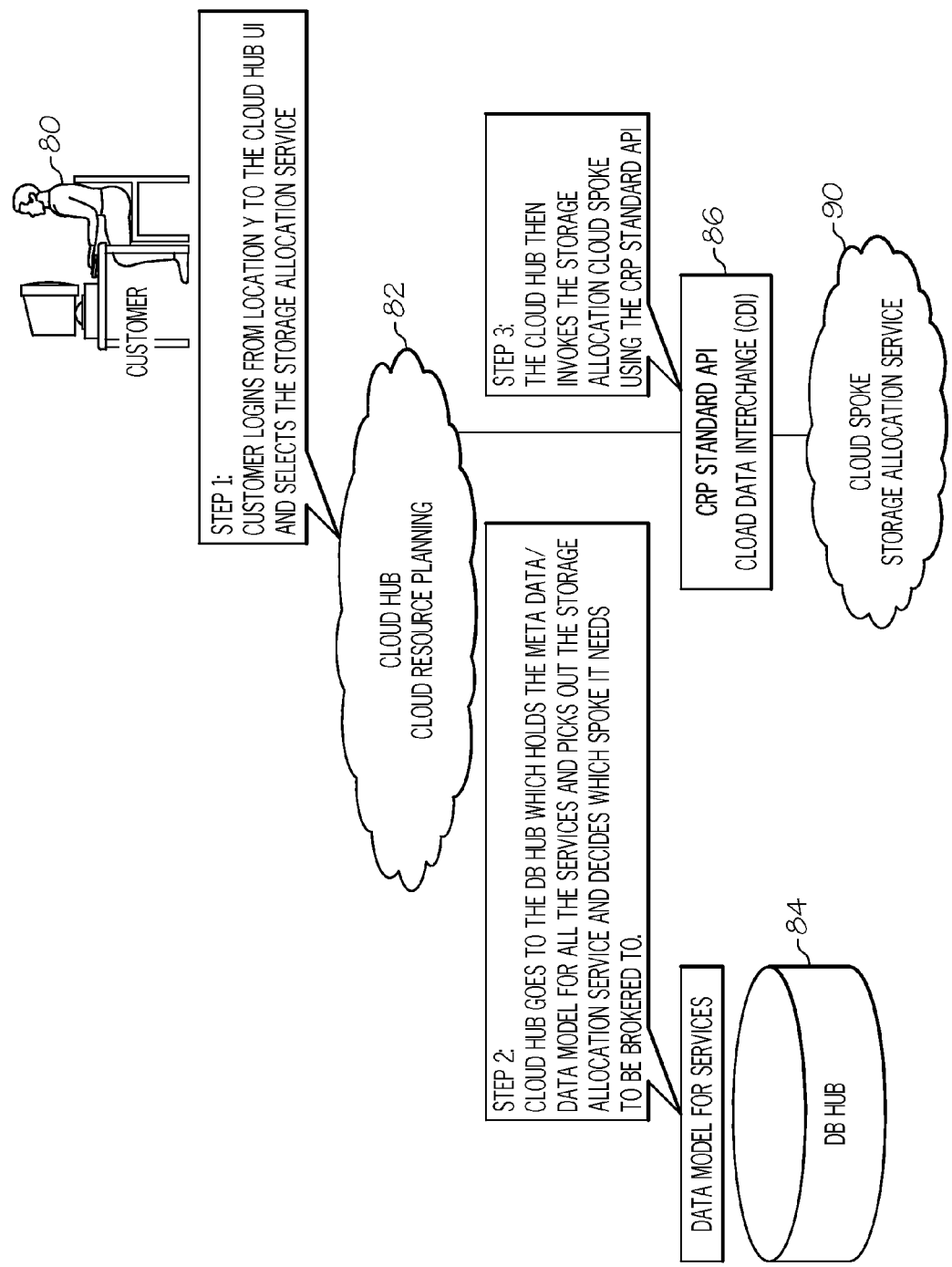
Figure 7:
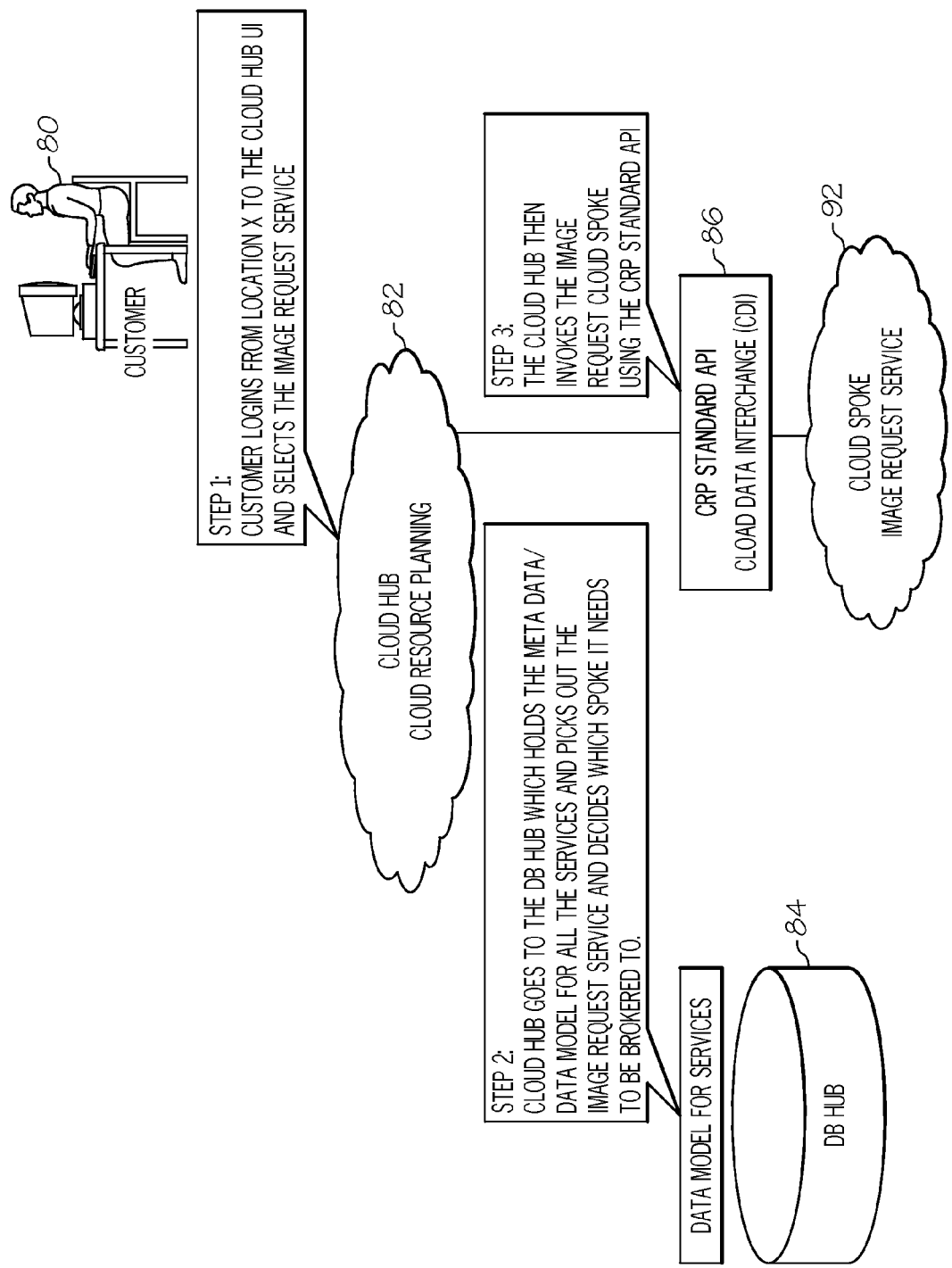

Examples of how requests (such as those illustrated in view of FIG. 4) are handled are shown in FIGS. 5-7. It should be understood in advance that FIGS. 5-7 are intended to be illustrative only and that are user types (e.g., customer versus administrator). First, FIG. 5 shows an example of using this disclosure within a LPAR provisioning scenario: In Step 1, Customer 80 logins from "location X" to the Portal User Interface for the Cloud portal Hub 82 to provision an LPAR on, for example, an AIX® machine. In Step 2, Cloud portal Hub 82 decides to which "spoke" (e.g., Cloud type/implementation) the request should be routed. This is typically accomplished by consulting database (Hub) 84 that holds that Data Model for all the Cloud Services (e.g., the Cloud Services Meta Data). In Step 3, the LPAR Provisioning Cloud Spoke 88 gets invoked and the (e.g., AIX®) machine gets provisioned via CRP Standard API 86. Here, customer 80 does not have to know anything about the technology/details of how to provision a LPAR for a particular machine type.

Similar functionality can be carried out for FIGS. 6-7 with respect to particular service providers. In Step 1 of FIG. 6, customer 80 logs in from "location Y" to the Portal User Interface for the Cloud portal Hub 82 to obtain storage allocation. In Step 2, Cloud portal Hub 82 decides to which "spoke" (e.g., Cloud service provider) the request should be routed. This is typically accomplished by consulting database (Hub) 84 that holds that Data Model for all the Cloud Services (e.g., the Cloud Services Meta Data). In Step 3, the Storage Allocation Service "spoke" 90 gets invoked and storage space gets allocated via CRP Standard API 86.

FIG. 7 depicts the process as used to obtain an image from a particular service provider (e.g., IBM®). In Step 1 of FIG. 7, customer 80 logs in from "location Y" to the Portal User Interface for the Cloud portal Hub 82 to obtain an image. In Step 2, Cloud portal Hub 82 decides to which "spoke" (e.g., Cloud service provider) the request should be routed. This is typically accomplished by consulting database (Hub) 84 that holds that Data Model for all the Cloud Services (e.g., the Cloud Services Meta Data). In Step 3, the Image request Service "spoke" 92 gets invoked and the requested image is obtained via CRP Standard API 86.

Figure 8:
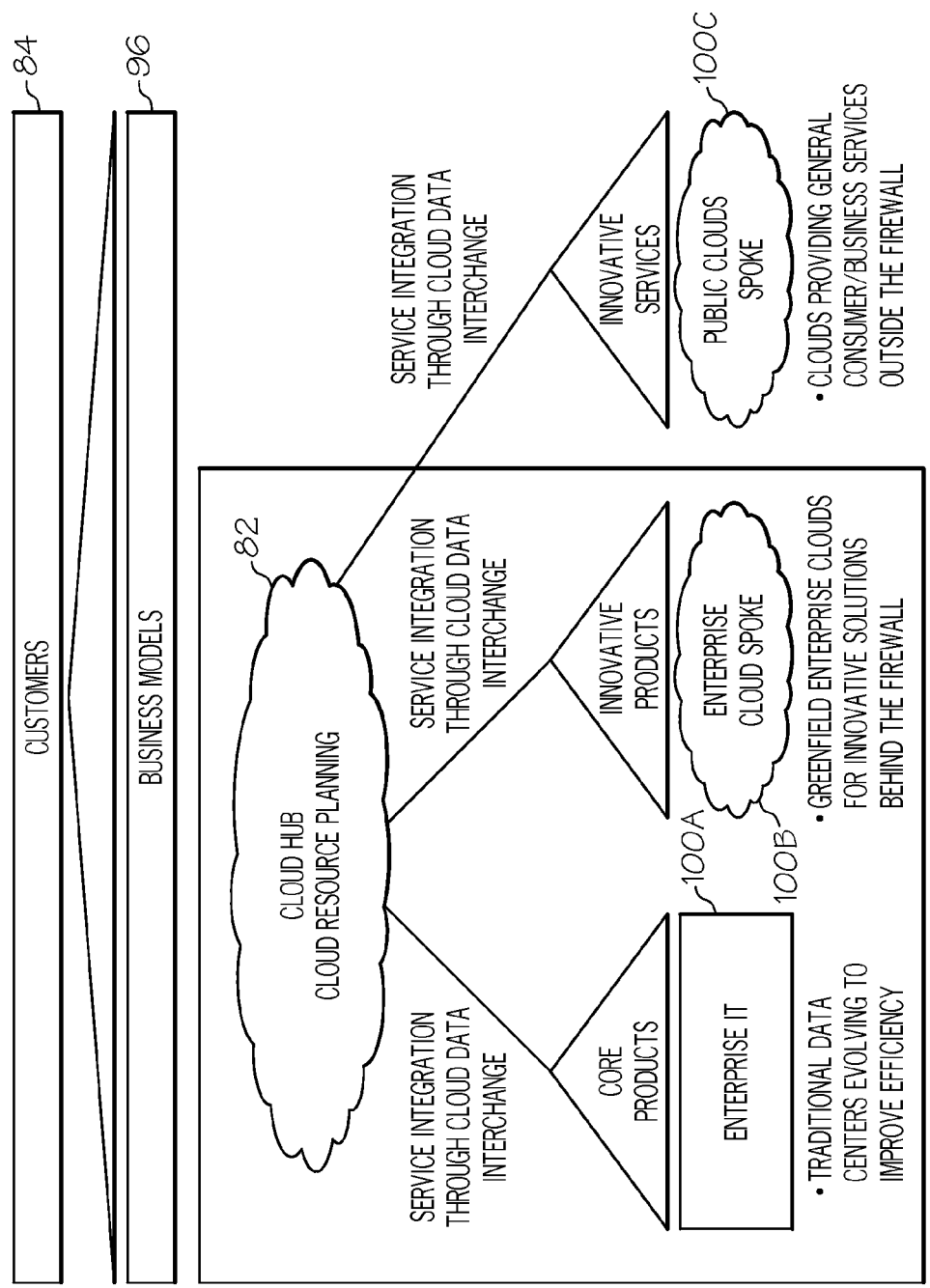
FIG. 8 shows a logical diagram integrating different Cloud deployment models (also referred to as Cloud types and/or Cloud implementations) according to the present invention.

These concepts are further illustrated in FIG. 8, which shows a logical diagram integrating different Cloud deployment models (also referred to as Cloud types and/or Cloud implementations) according to the present invention. As depicted, users 80 can access Cloud portal hub 82 using a front end/interface such as business models 96 (which may or may not be integrated with Cloud portal hub 82. Regardless, based on the request submitted by customer 80, Cloud portal hub 82 will determine/identify and select a particular Cloud implementation from among a plurality of Cloud implementations 100A-C. The examples shown in FIG. 8 are an internal Cloud implementation such as enterprise Information Technology (IT) Cloud 100A, a hybrid Cloud implementation such as Enterprise Cloud Spoke 100B, and a Public Cloud implementation such as Public Cloud Spoke 100C.

Figure 9:
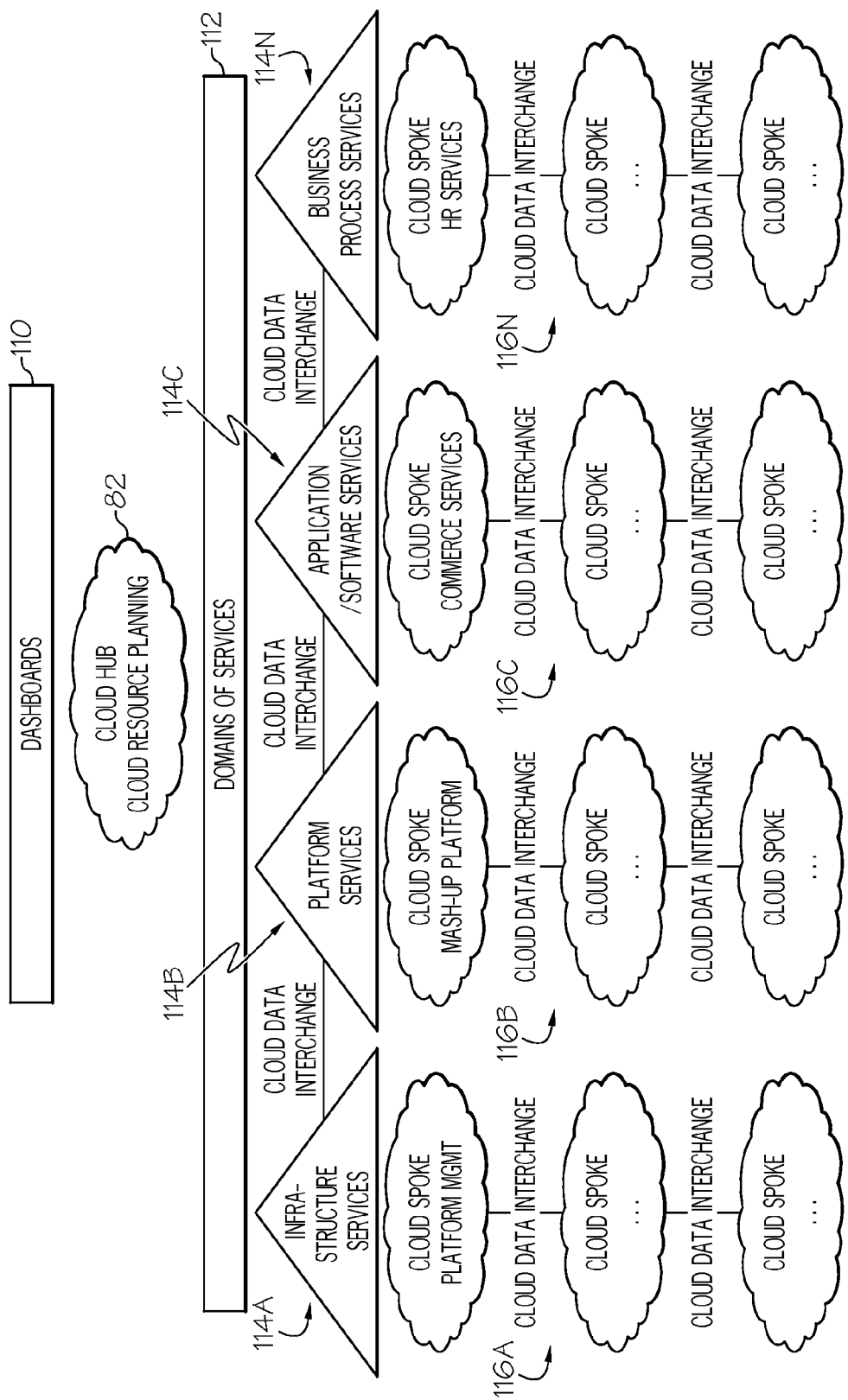
FIG. 9 shows a logical diagram integrating disparate Cloud service models according to the present invention.

FIG. 9 shows a logical diagram integrating disparate Cloud service models according to the present invention. As depicted, Cloud portal hub 82 can be accessed/can provide dashboard views 110 from which domain of services 112 can be viewed/accessed. As depicted, the Cloud portal hub can integrate any quantity of service types 114A-N from which any quantity of Cloud "spokes" 116A-N can be accessed. Any of the Cloud "spokes" 116A-N can provide access to an underlying service that customers can utilize. As can be seen from FIGS. 5-9, the present invention thus allows an nth level hierarchy of implementations, Clouds and/or services can be accessed from a central point (e.g., a single point of entry).

Figure 10:
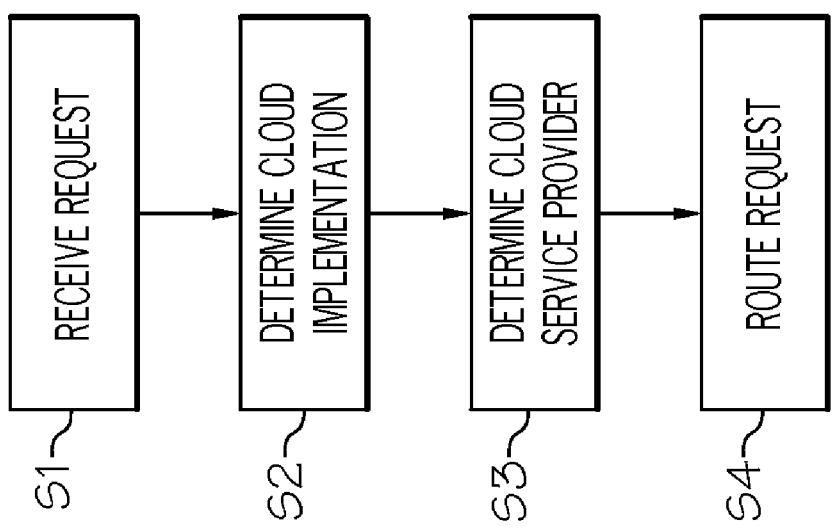
FIG. 10 shows a method flow diagram according to the present invention.

Referring now to FIG. 10, a method flow diagram according to the present invention is shown. As depicted in step S1, a request for Cloud services is received at a Cloud portal hub of a Cloud computing environment.

In step S2, a Cloud implementation is determined from a set of Cloud implementations for handling the request based on content of the request. In step S3, a Cloud service provider is determined from a set of Cloud service providers for fulfilling the request at the Cloud portal hub. In step S4, the request is routed to a Cloud service provider having the Cloud implementation via the Cloud portal hub.

While shown and described herein as a Cloud resource planning and data interchange functionality solution, it is understood that the invention further provides various alternative embodiments. For example, in one embodiment, the invention provides a computer-readable/useable medium that includes computer program code to enable a computer infrastructure to provide Cloud resource planning and data interchange functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide Cloud resource planning and data interchange functionality. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing Cloud resource planning and data interchange functionality. In this case, a computer infrastructure, such as computer system 12 (FIG. 1), can be provided, and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program; component software/a library of functions; an operating system; a basic device system/driver for a particular computing device; and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing resource planning and data interchange functionality within a Cloud computing environment, comprising:
 receiving a request for Cloud services at a Cloud portal hub of the Cloud computing environment;
 determining a plurality of domains of the requested Cloud services from a set of domains based on content of the request, the set of domains comprising platform as a service, software as a service, infrastructure as a service, and business process as a service;
 determining a Cloud implementation from a set of Cloud implementations for handling the request based on the content of the request;
 identifying at least one Cloud having the determined Cloud implementation, the at least one Cloud providing services of at least one of the determined plurality of domains;
 routing the request to the identified at least one Cloud via the Cloud portal hub; and
 integrating the services provided by the identified at least one Cloud to provision the requested Cloud services.

2. The method of claim 1, further comprising determining a Cloud service provider from a set of Cloud service providers for fulfilling the request at the Cloud portal hub, the routing further comprising routing the request to the Cloud service provider via the Cloud portal hub.

3. The method of claim 2, the Cloud service provider being available via the identified at least one Cloud.

4. The method of claim 1, the set of Cloud implementations comprising: a private Cloud, a public Cloud, a hybrid Cloud, and a community Cloud.

5. The method of claim 1, the Cloud portal hub being configured to receive requests from a plurality of requesters at a plurality of locations.

6. The method of claim 1, further comprising:
 receiving metadata into the Cloud portal hub through a Cloud data interchange; and organizing the metadata into a database associating Cloud implementations and Cloud service providers with Cloud services.

7. A Cloud portal hub for providing resource planning and data interchange functionality within a Cloud computing environment, comprising:
 a memory medium comprising instructions;
 a bus coupled to the memory medium; and
 a processor coupled to the bus that when executing the instructions causes the Cloud hub to:
  receive a request for Cloud services at a Cloud portal hub of the Cloud computing environment;
  determine a plurality of domains of the requested Cloud services from a set of domains based on content of the request, the set of domains comprising platform as a service, software as a service, infrastructure as a service, and business process as a service;
  determine a Cloud implementation from a set of Cloud implementations for handling the request based on the content of the request;
  identify at least one Cloud having the determined Cloud implementation, the at least one Cloud providing services of at least one of the determined plurality of domains;
  route the request to the identified at least one Cloud via the Cloud portal hub; and
  integrate the services provided by the identified at least one Cloud to provision the requested Cloud services.

8. The Cloud portal hub of claim 7, the Cloud portal hub further being caused to:
 determine a Cloud service provider from a set of Cloud service providers for fulfilling the request; and
 route the request to the Cloud service provider via the Cloud.

9. The Cloud portal hub of claim 8, the Cloud service provider being available via the identified at least one Cloud.

10. The Cloud portal hub of claim 7, the set of Cloud implementations comprising: a private Cloud, a public Cloud, a hybrid Cloud, and a community Cloud.

11. The Cloud portal hub of claim 7, the Cloud portal hub being configured to receive requests from a plurality of requesters at a plurality of locations.

12. The Cloud portal hub of claim 7, the Cloud portal hub further being caused to:
 receive metadata through a Cloud data interchange; and
 organize the metadata into a database associating Cloud implementations and Cloud service providers with Cloud services.

13. A non-transitory computer readable medium containing a program product for providing resource planning and data interchange functionality within a Cloud computing environment, the non-transitory computer readable medium comprising program code for causing a Cloud portal hub to:
 receive a request for Cloud services at a Cloud portal hub of the Cloud computing environment;
 determine a plurality of domains of the requested Cloud services from a set of domains based on content of the request, the set of domains comprising platform as a service, software as a service, infrastructure as a service, and business process as a service;
 determine a Cloud implementation from a set of Cloud implementations for handling the request based on the content of the request;
 identify at least one Cloud having the determined Cloud implementation, the at least one Cloud providing services of at least one of the determined plurality of domains;
 route the request to the identified at least one Cloud via the Cloud portal hub; and
 integrate the services provided by the identified at least one Cloud to provision the requested Cloud services.

14. The non-transitory computer readable medium containing the program product of claim 13, the non-transitory computer readable medium further comprising program code for causing the Cloud portal hub to:
 determine a Cloud service provider from a set of Cloud service providers for fulfilling the request; and
 route the request to the Cloud service provider via the Cloud portal hub.

15. The non-transitory computer readable medium containing the program product of claim 14, the Cloud service provider being available via the identified at least one Cloud.

16. The non-transitory computer readable medium containing the program product of claim 13, the set of Cloud implementations comprising: a private Cloud, a public Cloud, a hybrid Cloud, and a community Cloud.

17. The non-transitory computer readable medium containing the program product of claim 13, the non-transitory computer readable medium further comprising program code for causing the Cloud portal hub to receive requests from a plurality of requesters at a plurality of locations.

18. The non-transitory computer readable medium containing the program product of claim 13, further comprising program code for causing the Cloud portal hub to:
 receive metadata through a Cloud data interchange; and
 organize the metadata into a database associating Cloud implementations and Cloud service providers with Cloud services.

19. A method for deploying a system for providing resource planning and data interchange functionality within a Cloud computing environment, comprising:
 providing a computer infrastructure being operable to:
  receive a request for Cloud services at a Cloud portal hub of the Cloud computing environment;
  determine a plurality of domains of the requested Cloud services from a set of domains based on content of the request, the set of domains comprising platform as a service, software as a service, infrastructure as a service, and business process as a service;
  determine a Cloud implementation from a set of Cloud implementations for handling the request based on the content of the request;
  identify at least one Cloud having the determined Cloud implementation, the at least one Cloud providing services of at least one of the determined plurality of domains;
  route the request to the identified at least one Cloud via the Cloud portal hub; and
  integrate the services provided by the identified at least one Cloud to provision the requested Cloud services.

20. The method of claim 19, the computer infrastructure being the Cloud portal hub.

21. The method of claim 6, the determining a Cloud implementation comprising accessing the database to identify the Cloud implementation.

22. The Cloud portal hub of claim 12, the Cloud portal hub further being caused to access the database to determine the Cloud implementation.

23. The non-transitory computer readable medium containing the program product of claim 18, the non-transitory computer readable medium further comprising program code for causing the Cloud portal hub to access the database to identify the Cloud implementation.

* * * * *